Oct. 5, 1965 J. H. CASTOE Re. 25,874
SPRING COMPRESSOR TOOL
Original Filed Dec. 27, 1960
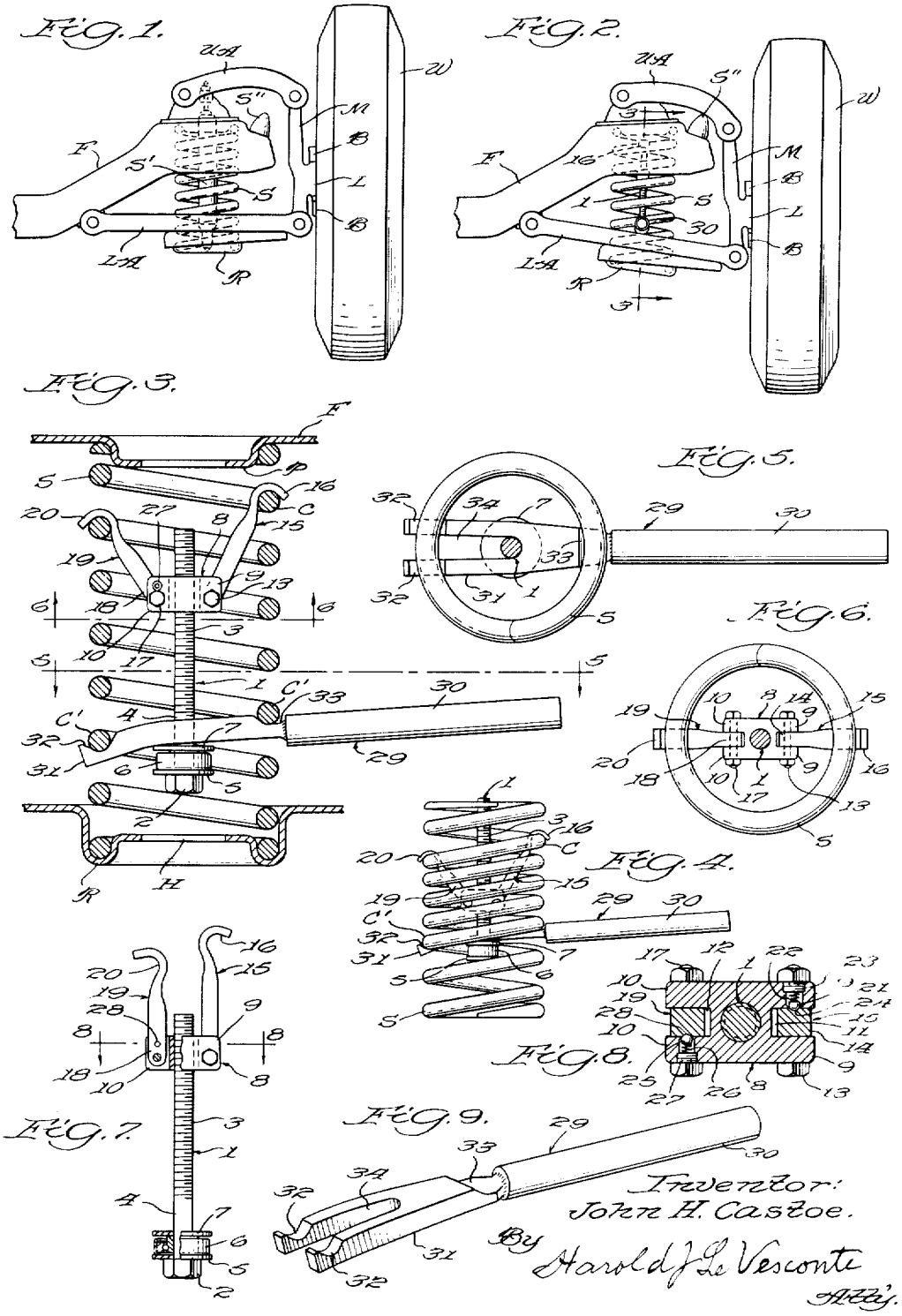

United States Patent Office

Re. 25,874
Reissued Oct. 5, 1965

25,874
SPRING COMPRESSOR TOOL

John H. Castoe, 6718 Shady Grove St., Tujunga, Calif.

Original No. 3,051,443, dated Aug. 28, 1962, Ser. No. 78,610, Dec. 27, 1960. Application for reissue Apr. 1, 1964, Ser. No. 366,932
19 Claims. (Cl. 254—10.5)

Matter enclosed in heavy brackets [ ] appears in the original patent but forms no part of this reissue specification; matter printed in italics indicates the additions made by reissue.

This invention relates to spring compressing tools and more particularly to a tool for compressing the frame supporting coil springs associated with the wheels of automotive vehicles incident to the service work such as changing shims associated with the wheel suspension means or other work requiring the removal of the springs. The springs are very heavy and each carries approximately one-fourth or more of the sprung weight of the vehicle and heretofore the various tools provided for compressing the springs were those which reacted between a portion of the vehicle chassis and the spring, wherefore, the spring could not be removed while thus compressed.

With these considerations in mind, it is the principal object of the invention to provide a spring compressing tool for coil type frame supporting springs of motor vehicles which engages spaced coils of the springs and draws them together to compress the spring so that it can be removed from the portions of the vehicle axle structure between which it reacts and can be as readily replaced while held in such compressed condition.

*A particular object of my invention resides in the formation of a device supported wholly within the confines of the coils of a helical spring and between the end coils thereof, having radial spaced means adapted to engage with circumferentially spaced coils therein, together with intermediate means for relatively moving and retaining said radially spaced means and the engaged coils.*

Another object of the invention is to provide a compressing tool for helical, frame supporting springs of a motor vehicle chassis which tool is contained within the spring *and has a manual handling portion extending radially therefrom between and outwardly from the coils of said helical spring, providing a handle support for the coil spring.*

A further object of the invention is to provide a compressor for helical type frame supporting springs of motor vehicles which engages the spring at two axially spaced convolutions thereof at diametrically opposite points on said two convolutions and which includes means for compensating for the angular displacement of such diametrically opposite points on the spring convolutions thus engaged.

Still another object of the invention is to provide a compressor for the helical type frame supporting springs of motor vehicles in which one portion of said compressor projects radially from a spring engaged thereby and thus serves as a convenient handle means for removing or replacing a compressed spring held by the tool.

A still further object of the invention is to provide a spring compressor in which the foregoing objectives are realized in practice, which is simple in construction and economical to manufacture, which is both easy and safe to use, which does not require more than ordinary skill for effective use, and which is effective for its intended purpose.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a front elevational view of a vehicle front wheel and the springing means associated therewith as normally supporting the vehicle frame, FIG. 2 is a view similar to FIG. 1 but showing the relation of the parts when the vehicle is raised from the ground for service work as, for instance by a hoist or the like, and showing the device of the present invention applied thereto to compress the spring, FIG. 3 is an enlarged scale, medial, sectional view of the spring and upper and lower frame members engaged thereby, the view being taken on the line 3—3 of FIG. 2, FIG. 4 is a view of the compressed spring and compressor after removal from the vehicle; the view being taken as viewed in the same direction as indicated by the arrows associated with the line 3—3 of FIG. 2 but from the left hand side of the spring, the scale being slightly less than that of FIG. 3, FIGS. 5 and 6 are, respectively, transverse, sectional views taken on the lines 5—5 and 6—6 of FIG. 4, FIG. 7 is a side elevational view, partly in section of the compressor tool of the invention as arranged preparatory to application to a spring, FIG. 8 is an enlarged, transverse sectional view taken on the line 8—8 of FIG. 7, and FIG. 9 is a perspective view of the combined coil engaging fork element and handle means associated with the rest of the tool shown in FIG. 7, the scale being slightly larger than the scale of FIG. 7.

Referring first to FIGS. 1 and 2, there is shown a typical independently sprung front wheel mounting for a motor vehicle including a frame, member F upon which a wheel W is rotatably mounted on a spindle which, in turn, is mounted for swinging movement about a vertical axis incident to steering the vehicle by bearing portions B, B of the spindle which are hingedly mounted on and are disposed on opposite sides of the lug L of an axle supporting member M for movement about a substantially vertical axis; said member having an upper end pivotally connected to one end of an upper arm UA and having its lower end similarly pivotally connected to one end of a lower arm LA, the other ends of said arms being separately pivotally attached to the frame member F and the pivotal connections of said arms to the member M and frame member F being horizontal and parallel to each other. A compression type helical spring S has the upper end thereof engaged by a slight depending boss portion P of the frame member F, and the lower end engaging in an annular recess R in the lower arm, whereby, the portion of the frame F is yieldingly supported by the spring, it being understood that the other front wheel is similarly yieldingly mounted with respect to the vehicle frame. In addition to the foregoing structure, the wheel mounting includes a shock absorber S′ operative to check the rate of action and reaction of the spring S and with a resilience snubber S″ to positively limit the extent of upward movement of the frame relative to the wheel.

The illustrated embodiment of the invention comprises a bolt 1 which is nearly as long as the spring S, said bolt having an enlarged head 2 adapted for engagement with a wrench and with a body including a threaded portion 3 which extends for the greater portion of the length thereof and an unthreaded portion 4 which carries a thrust bearing assembly comprising a washer 5 engaging the bolt head, an end thrust ball bearing assembly 6 mounted on the side of the washer 5 opposite the bolt head 2 and the second washer 7 engaging the opposite side of the bearing 6. The threaded portion 3 of the bolt body engages a nut component 8 having pairs of arms 9, 9 and 10, 10 disposed at opposite sides thereof; said pairs defining, respectively, slots 11 and 12 which extend parallel to the axis of the bolt. Pivotally mounted within the slot 11 on a pivot bolt 13 is the end 14 of a spring coil engaging hook member 15, the opposite end 16 thereof being formed into a hook adapted to engage a coil C of the spring S at a point adjacent the end engaging the upper arm UA as best shown in FIG. 3. Pivotally mounted in the slot 12 on a transverse pivot bolt 17 is the end 18 of a second hook member 19 having at its opposite end a spring coil engaging hook 20. Since said hook member engages the spring coil at a point diametrically opposite the engagement thereof by the hook end 16, this hook is sufficiently shorter than the said hook 15 so that it engages the spring coil at the position of the coil when the spring is extended as shown in FIGS. 2 and 3. Alternatively, the hooks 15 and 19 could be of equal length and be pivotally mounted on the nut component at points thereon spaced from each other axially of the bolt by a distance equal to one-half of the lead of the extended spring. One of the arms 9 carries a detent ball 21 biased by a spring 22 reacting against the end of a screw 23 and causing the ball to engage a socket 24 formed in a side face of the end 14 of the hook member 15 as best shown in FIG. 8 and effective to releasably hold said hook member in substantially parallel relation to the bolt 1 as shown in FIG. 7. One of the arms 10 carries a similar detent ball 25 similarly biased by a spring 26 reacting against the screw 27 and correspondingly yieldingly engaging a socket 28 in the end of the hook member 19 and serving to releasably hold said hook member in a position parallel to the bolt 1 as also shown in FIG. 7.

Cooperating with the bolt bearing assembly and the nut having the coil engaging hooks is a coil engaging fork 29 having a straight handled portion 30 carrying as an extension of one end of said handle, a coil engaging portion 31 having transverse grooves 32 and 33 on one face thereof adapted to engage the seat one of the coils C′ of the spring S at diametrically opposite points. The distal end of the coil engaging portion is provided with a slot 34 extending therethrough parallel to the axis of the bolt and said slot 34 extends inwardly from the said distal end a distance sufficient to straddle the body of the bolt 1 when the grooves 32 and 33 of said fork are in an engagement with the spring coil C′ as best shown in FIG. 5.

To put the device of the invention in use the vehicle is first placed on a hoist or other means whereby the wheel is lifted from the ground and with the upper arm of the springing means engaging the snubber S″ as shown in FIG. 2. The axially disposed shock absorber unit S′ is removed from the assembly. The bolt and the associated nut and bearing components as shown in FIG. 7 is arranged with the hoop portions held in parallel position as shown in FIG. 7 by the detent means and is introduced into the interior of the spring through the centrally disposed hole H in the lower arm LA. The hooks 15 and 19 are then moved outwardly into engagement with one of the spring coils and following this the fork member 29 is introduced between coils adjacent the head end of the bolt and above the bearing assembly so that the grooves 32 and 33 thereof also engage one of the spring coils. The bolt is then rotated by a wrench to draw the nut and bolt head toward each other with resultant compression of the spring to an extent which will allow the spring to be removed by being unseated from the frame member F and the lower arm. In FIG. 4 the compressed spring will be noted as having the coils engaged by the tool more tightly compressed than the end coils. Under these conditions, the handle 30 of the fork member 29 serves as a convenient means for manipulating the spring. When the required service work has been completed, the spring is reseated in the recess R and the bolt 1 rotated in the opposite direction to allow the spring to again expand until it fully engages the frame member and picks up the load after which the fork member 29 is removed and the hooks disengaged from the spring coils and returned to their parallel position so that the bolt and parts mounted thereon can be removed through the hole H. The shock absorber assembly is then replaced within the spring to complete the work.

While in the foregoing specification there has been disclosed a presently preferred embodiment of the invention, it will be appreciated that in the light of such disclosure changes and modifications will suggest themselves to others skilled in the art to which the invention appertains. Accordingly, it will also be understood that the invention is not to be deemed to be limited to the embodiment thus disclosed by way of example and that the invention includes as well, all such modifications and changes in the parts and in the construction, combination and arrangement of parts as shall come within the purview of the appended claims.

I claim:

1. In a tool for compressing helical springs and holding the springs engaged thereby in compressed condition a screw threaded bolt adapted to be positioned within the spring and substantially axially aligned with the axial line of the spring, a nut on the threaded body of said bolt, at least two spring coil engaging members carried by said nut and having hooked ends adapted to engage a convolution of the spring at equally peripherally spaced points, a head on said bolt adapted for engagement by a wrench, a thrust bearing on said bolt and engaging the said head, and a fork member adapted to extend between adjacent convolutions of the spring and engage the side of said thrust bearing opposite the bolt head; said fork member having a slot straddling said bolt and having coil engaging grooves on the face thereof which is opposite the face which engages said thrust bearing.

2. A spring compressing tool as claimed in claim 1 in which said spring coil engaging members are pivotally mounted on said nut for movement about axes normal to the axis of said bolt between an extended, coil-engaging position and a retracted position parallel to said bolt for insertion of said coil engaging members into the spring.

3. A spring compressing tool as claimed in claim 1 in which said fork member is provided with a handle projecting radially outwardly beyond the outer periphery of a spring engaged and compressed by said tool.

4. A spring compressing tool as claimed in claim 1 in which the coil engaging hooked ends of said hooks are positioned at different positions axially of said bolt substantially corresponding to the lead of the spring convolution engaged thereby.

5. A spring compressing tool as claimed in claim 2 in which said nut and spring coil engaging members include yieldingly displaceable detent means effective to hold said hooks in said retracted position to facilitate insertion of the nut element and said members into the end of a spring to be engaged by said members.

6. In a tool for compressing heavy helical springs, a nut element adapted to be disposed within the spring; said nut element having retractable means for engaging a convolution of a spring inwardly from and adjacent one end of the spring and at substantially equally, peripherally spaced points on the engaged convolution, a bolt for disposition substantially axially within the spring and threadedly engaging said nut element, other means for engaging a convolution of the spring inwardly from and adjacent to the opposite end of the spring and at a point spaced from the convolution engaged by said retractable means, said other spring convolution engaging means detachably engaging said bolt, a head on said bolt affording means for engagement with a wrench for rotating said bolt, and a thrust bearing means interposed between said bolt head and said other spring convolution engaging means.

7. A spring compressing tool as claimed in claim 6 in which said other spring convolution engaging means includes a member having a forked end portion adapted to straddle said bolt and having a width permitting insertion thereof between adjacent convolutions of the spring at the side of said thrust bearing opposite the side engaged by the head of said bolt.

8. A spring compressing tool as claimed in claim 6 in which said spring convolution engaging means adjacent both ends of the bolt are designed to accommodate the helical angle at substantially diametrically opposite points of the spring convolutions engaged thereby.

*9. A device for shortening a helical spring for insertion between and removal from spaced spring mounting seats, comprising axially spaced means disposed within said spring for engaging circumferentially spaced points on a coil of said spring at points removed from each end coil thereof, and second means coaxial with the axis of said spring, shorter than said spring when said spring is under maximum expected contraction and completely within said spring for moving and retaining said axially spaced means toward each other.*

*10. A device for shortening a helical spring for insertion between and removal from spaced spring mounting seats, comprising first axially spaced means disposed within said spring for engaging circumferentially spaced points on a coil of said spring at points removed from each end coil thereof, and second means also within said spring for moving and retaining said axially spaced means toward each other in which one of said axially spaced means has a manual handling portion extending radially from said second means between and outwardly from the coils of said helical spring.*

*11. A device for shortening a helical spring for insertion between and removal from spaced spring seats comprising spaced means for engaging the coils of the spring at points removed from the end coils and means coaxial with the axis of said spring, shorter than said spring when said spring is under maximum expected contraction and completely within the coils of the spring for moving said spaced means toward each other.*

*12. A device for shortening a helical spring for insertion between and terminating between the end coils thereof and removal from spaced spring seats comprising, a support disposed within said spring, two pairs of radially spaced arms mounted on remote end portions of said support for engagement with spaced coils of said spring, one of said arms extending through the convolutions of said spring and positioned without said spring and means for moving the arms and engaged coils toward each other.*

*13. A tool for shortening a helical spring for insertion between and removal from oppositely spaced spring mounting seats of an automobile body, comprising rod means adapted to be positioned wholly within the confines of said spring to extend parallel with axis thereof and between the end coils of said spring, a first member movably mounted on one end portion of said rod means and adapted to engage an inner convolution of said spring, a second member extending radially from the opposite end portion of said rod means and adapted to engage another inner convolution of said spring, said second means extending through the convolutions of said spring and forming a handle support without said spring, and means also within the confines of said spring for relatively moving and securing said first and said second members parallel to the axis of said spring.*

*14. A device for shortening a helical spring for insertion between and removal from spaced spring seats comprising, spaced means within said spring for engaging spaced coils of said spring at points inwardly removed from the end coils thereof, means insertable within the coils of said spring for moving said spaced means and engaged coils toward each other, and means integral with one of said spaced means for supporting said spring while in shortened condition for insertion between or removal from said spaced seats.*

*15. A tool for compressing, securing and handling vehicle suspension coil springs, comprising rod means adapted to be positioned wholly within the coils of said spring to extend axially between the end coils thereof, a first member movably mounted on one end portion of said rod, and adapted to engage an inner convolution of said springs at circumferentially spaced points therearound, a second member mounted on the opposite end portion of said rod means and adapted to engage another inner convolution of said spring at circumferentially spaced points therearound, axially spaced from said first member, said second member extending through the convolutions of said spring and forming a handle support without said spring, and means for adjustably securing one of said members on said rod means in axially spaced relation relative to the other of said members.*

*16. A tool for shortening a helical vehicle spring for insertion between and removal from oppositely spaced spring seats, comprising first inner coil engaging means at points circumferentially disposed thereon within said spring adjacent one end coil thereof, a second means engaging a convolution of said spring at circumferentially spaced points thereon adjacent the opposite end coil of said spring, said second means extending through the convolutions of said spring and forming a handle support without said spring, and relatively movable means interconnecting said first and second means within said spring for altering the distance between said end coils of said spring.*

*17. The tool of claim 16, in which at least one of said first and second mentioned means intersects the axis of said coil spring.*

*18. In a tool for handling compressed helical springs and holding said springs in compressed position, rod means adapted to be positioned wholly within coils of the spring and extended axially between the ends thereof, a first member movably mounted adjacent one end of said rod means and adapted to engage a convolution of said spring, a second member mounted adjacent the other end of said axially extending rod means and adapted to engage a convolution of said spring at a location spaced from said first mentioned member, said rod means defining means for altering the distance between said first and second members and means extending substantially normal to said rod means outwardly and beyond the coils of said spring engaged by said tool whereby to lift and transport said spring, and means holding said movably mounted member in any adjusted position.*

*19. In a tool for holding compressed helical springs in compressed position, means adapted to be positioned wholly within the spring and extended axially thereof, first means movably mounted adjacent one end of said axially extending means and adapted to engage a convolution of said spring, a second means mounted adjacent the other end of said axially extending means, said second means being adapted to engage a convolution of said spring at a location spaced from said movably mounted means, said means adapted to be positioned defining means for altering the distance between said first and second means and means holding said movably mounted means in any adjusted position.*

References Cited by the Examiner

The following references, cited by the Examiner, are of record in the patented file of this patent or the original patent.

UNITED STATES PATENTS

| | | | |
|---|---|---|---|
| 1,425,796 | 8/22 | Salsgiver. | |
| 2,721,376 | 10/55 | Showman | 29—227 |
| 3,014,713 | 12/61 | Fenton | 267—60 |
| 3,067,500 | 12/62 | Bliss | 29—227 |

WILLIAM FELDMAN, *Primary Examiner.*